(12) United States Patent
Liu et al.

(10) Patent No.: US 8,913,588 B2
(45) Date of Patent: Dec. 16, 2014

(54) HANDOVER METHOD, COMMUNICATION DEVICE AND COMMUNICATION SYSTEM

(71) Applicant: Huawei Technologies Co., Ltd., Shenzhen (CN)

(72) Inventors: Jing Liu, Shenzhen (CN); Ningjuan Chang, Shenzhen (CN); Wang Ke, Shenzhen (CN); Yan Peng, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 20 days.

(21) Appl. No.: 13/633,020

(22) Filed: Oct. 1, 2012

(65) Prior Publication Data
US 2013/0100929 A1 Apr. 25, 2013

Related U.S. Application Data

(63) Continuation of application No. PCT/CN2011/075168, filed on Jun. 2, 2011.

(30) Foreign Application Priority Data

Jun. 28, 2010 (CN) .......................... 2010 1 0216472

(51) Int. Cl.
*H04W 4/00* (2009.01)
*H04W 36/00* (2009.01)

(52) U.S. Cl.
CPC .......... *H04W 36/00* (2013.01); *H04W 36/0005* (2013.01); *H04W 36/0016* (2013.01)
USPC ........................................ 370/331; 455/436

(58) Field of Classification Search
CPC ............ H04W 36/00; H04W 36/0016; H04W 36/0005
USPC .......................................... 370/331; 455/436
See application file for complete search history.

(56) References Cited

U.S. PATENT DOCUMENTS

| | | | |
|---|---|---|---|
| 2006/0111111 | A1 | 5/2006 | Ovadia |
| 2009/0117901 | A1 | 5/2009 | Zhao et al. |
| 2010/0142488 | A1 | 6/2010 | Zhang et al. |

(Continued)

FOREIGN PATENT DOCUMENTS

| | | |
|---|---|---|
| CN | 101175304 A | 5/2008 |
| CN | 101188861 A | 5/2008 |

(Continued)

OTHER PUBLICATIONS

Second Japanese Office Action received in Application No. 2013-514538, mailed Nov. 19, 2013, 7 pages.

(Continued)

*Primary Examiner* — Omer S Mian
(74) *Attorney, Agent, or Firm* — Slater & Matsil, L.L.P.

(57) ABSTRACT

The present invention provides a handover method. An access node obtains mobility management entity pool MME pool information which is sent by a donor station of the access node and is used for identifying a mobility management entity MME to which a user equipment UE is attached. The access node initiates handover for the UE according to the MME pool information used for identifying the MME to which the UE is attached. The present invention further provides a communication device and a communication system.

20 Claims, 6 Drawing Sheets

(56) References Cited

U.S. PATENT DOCUMENTS

| | | | |
|---|---|---|---|
| 2010/0316096 A1* | 12/2010 | Adjakple et al. | 375/211 |
| 2011/0237258 A1* | 9/2011 | Nylander et al. | 455/437 |
| 2011/0269499 A1* | 11/2011 | Vikberg et al. | 455/524 |
| 2011/0286429 A1* | 11/2011 | Vikberg et al. | 370/331 |

FOREIGN PATENT DOCUMENTS

| | | |
|---|---|---|
| CN | 101400084 A | 4/2009 |
| CN | 101754308 A | 6/2010 |
| CN | 102300190 A | 12/2011 |
| EP | 2020820 A1 | 2/2009 |
| EP | 2 190 222 A1 | 5/2010 |
| EP | 2 547 148 A1 | 1/2013 |
| WO | WO 2009/024082 A1 | 2/2009 |
| WO | WO 2009/100628 A1 | 8/2009 |
| WO | WO 2011144145 A1 | 11/2011 |

OTHER PUBLICATIONS

Samsung, "S1 Update and Setup," R3-081215, 3GPP TSG-RAN WG3 Meeting #60, Kansas City Missouri, May 5-9, 2008, 3 pages.

Japanese Office Action for Patent Application No. 2013-514538, mailed May 21, 2013 with English translation, 7 pages.

3GPP TSG-RAN WG3 AH, "Consideration on HeNB-to-HeNB Mobility," R3-101864, Beijing, P.R. China, Jun. 29-Jul. 1, 2010, 3 pages.

3GPP TSG-RAN WG3 AH, "Consideration on the enhanced HeNB-to-Macro mobility," R3-101865, Beijing, P.R. China, Jun. 29-Jul. 1, 2010, 2 pages.

3GPP TSG-RAN WG3 AH, "Consideration on RN configuration and OAM issues," R3-101866, Beijing, P.R. China, Jun. 29-Jul. 1, 2010, 2 pages.

3GPP TSG-RAN WG3 AH, "Consideration on HO type choosing issue," R3-101867, Beijing, P.R. China, Jun. 29-Jul. 1, 2010, 3 pages.

3GPP TSG-RAN WG3 AH, "Methods to handover routing issue with relay," R3-101868, Beijing, P.R. China, Jun. 29-Jul. 1, 2010, 3 pages.

3GPP TSG-RAN WG3 AH, "ANR related procedures with relay," R3-101869, Beijing, P.R. China, Jun. 29-Jul. 1, 2010, 2 pages.

3GPP TSG-RAN WG3 AH, "Non UE-associated X2 messages processing at DeNB," R3-101870, Beijing, P.R. China, Jun. 29-Jul. 1, 2010, 4 pages.

3GPP TSG-RAN WG3 AH, "On the selection of RN-UE's SGW," R3-101872, Beijing, P.R. China, Jun. 29-Jul. 1, 2010, 2 pages.

3GPP TSG-RAN WG3 # adhoc, "GU Group id and HO Type," R3-101896, Beijing, China, Jun. 29-Jul. 1, 2010, 2 pages.

3GPP TSG-RAN WG3 # Ad-Hoc, "Termination of X2 non-UE-associated messages," R3-101897, Beijing, China, Jun. 29-Jul. 1, 2010, 3 pages.

3GPP TSG-RAN WG3 # Ad-Hoc, "NodeB informed when UE reading inter-frequency CSG/Hybrid Cell," R3-101898, Beijing, P.R. China, Jun. 29-Jul. 1, 2010, 2 pages.

3GPP TSG-RAN WG3 # AdHoc, "Solution discussion for optimized HeNB-to-HeNB mobility," R3-101899, Beijing, China, Jun. 29-Jul. 1, 2010, 4 pages.

Written Opinion of the International Searching Authority for International Application No. PCT/CN2011/075168, Mailed Sep. 8, 2011, 4 pages.

Chinese Office Action, CN Application No. 201010216472.2, Jun. 4, 2012, 4 pages.

Chinese International Search Report, CN Application No. 201010216472.2, Mar. 28, 2012, 5 pages.

International Search Report, English Translation; PCT/CN2011/075168 filed Jun. 2, 2011, 4 pages.

3GPP TS 36.300 V10.0.0 (Jun. 2010), $3^{rd}$ Generation Partnership Project: Technical Specification Group Radio Access Network; Evolved Universal Terrestrial Radio Access (E-UTRA) and Evolved Universal Terrestrial Radio Access Network (E-UTRAN); Overall description; Stage 2 (Release 10); 183 pages.

3GPP TS 36.413 V9.3.0 (Jun. 2010), $3^{rd}$ Generation Partnership Project: Technical Specification Group Radio Access Network; Evolved Universal Terrestrial Radio Access Network (E-UTRAN); S1 Application Protocol (S1AP) (Release 9); 214 pages.

3GPP TSG RAN WG3 #68, Montreal, Canada, May 10-14, 2010; R3-101412; "Problems of UE handover in the relaying network," 3 pages.

Extended European Search Report for European Application No. 11783062.0-1857; Applicant Huawei Technologies Co., Ltd., mailed Feb. 21, 2013, 7 pages.

R3-101867, "Consideration on HO type choosing issue," 3GPP TSG-RAN WG3 AH, Jun. 29-Jul. 1, 2010, Beijing, P.R. China, 3 pages.

R3-101896, "GU Group id and HO type," 3GPP TSG RAN WG3 #adhoc, Jun. 29-Jul. 1, 2010, Beijing, P.R. China, 2 pages.

Nokia, "HO Type Determination," 3GPP TSG-RAN WG3 meeting RAN3#69bis, R3-102808, Xi'an, China Oct. 11-15, 2010, 6 pages.

European Office Action received in Application No. 11783062.0-1857, Mailed Dec. 13, 2013, 4 pages.

* cited by examiner

HANDOVER METHOD, COMMUNICATION DEVICE AND COMMUNICATION SYSTEM

This application is a continuation of co-pending International Application No. PCT/CN2011/075168, filed Jun. 2, 2011, which claims priority to Chinese Patent Application No. 201010216472.2, filed Jun. 28, 2010, both of which applications are incorporated herein by reference.

TECHNICAL FIELD

The present invention relates to the field of communications technologies, and in particular, to a handover method, a communication device and a communication system.

BACKGROUND

In a long term evolution (Long Term Evolution, LTE) system, in an intra-evolved UMTS terrestrial radio access network (intra-Evolved UMTS Terrestrial Radio Access Network, intra-E-UTRAN), and based on different handover reference points, two handover types may exist, including X2-based handover (X2 handover) and S1-based handover (S1 handover).

In X2 handover, an X2 interface between a source base station (eNB) and a target eNB acts as a reference point, and during a handover procedure, a mobility management entity (Mobility Management Entity, MME) to which a user equipment (User Equipment, UE) is attached does not change. That is, the X2 handover is based on a premise that an S1 interface exists between the source eNB and the MME to which the UE is attached, and an S1 interface exists between the MME to which the UE is attached and the target eNB. In S1 handover, an S1 interface acts as a reference point, and in this case, the MME to which the UE is attached may change, and a source MME decides whether it is required to change the MME to which the UE is attached and to select a new MME.

After a relay node (Relay Node, RN) is introduced into the LTE system, for handover of a UE in coverage of the RN, the RN cannot correctly decide a handover type.

SUMMARY OF THE INVENTION

Embodiments of the present invention provide a handover method, a communication device and a communication system, so as to enable an access node to initiate handover for a UE.

In one aspect, an embodiment of the present invention provides a handover method, which includes: obtaining, by an access node, mobility management entity pool MME pool information which is sent by a donor station of the access node and is used for identifying an MME to which a UE in coverage of the access node is attached; and when the UE is required to be handed over, initiating, by the access node, handover for the UE according to the MME pool information used for identifying the MME to which the UE is attached.

In another aspect, an embodiment of the present invention provides a communication device, which includes an obtaining unit, configured to obtain MME pool information which is sent by a donor station of the communication device and is used for identifying an MME to which a UE in coverage of an access node is attached; and a handover unit, configured to initiate handover for the UE according to the MME pool information that is obtained by the obtaining unit and is used for identifying the MME to which the UE is attached when the UE is required to be handed over.

In another aspect, an embodiment of the present invention further provides a communication system, and the communication system includes the aforementioned communication device.

In another aspect, an embodiment of the present invention further provides another communication device, which includes a control unit, configured to control a sending unit to send information; the sending unit, associated with the control unit and configured to send, according to the control of the control unit, mobility management entity pool MME pool information used for identifying a mobility management entity MME to which a user equipment UE in coverage of an access node is attached to the access node. The communication device is a donor station of the access node.

In another aspect, an embodiment of the present invention further provides another communication system, and the communication system includes the aforementioned another communication device.

According to the technical solutions provided by the embodiments of the present invention, when an access node initiates handover for a UE, the handover may be successfully performed through MME pool information that is sent by a donor station of the access node and is of an MME to which the UE is attached.

DETAILED DESCRIPTION OF ILLUSTRATIVE EMBODIMENTS

In order to make specific technical solutions of the present invention clearer, description is further provided below with reference to specific embodiments and the accompanying drawings.

Figure 1:
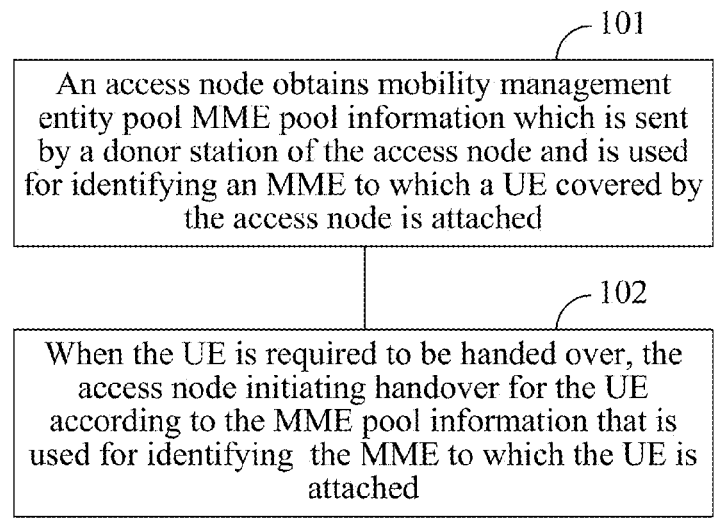
FIG. 1 is a schematic flow chart of a handover method provided by an embodiment of the present invention.

As shown in FIG. 1, an embodiment of the present invention provides a handover method, and the method includes:

Step 101: An access node obtains mobility management entity pool MME pool information which is sent by a donor station of the access node and is used for identifying an MME to which a UE in coverage of the access node is attached.

Step 102: When the UE is required to be handed over, the access node initiating handover for the UE according to the MME pool information that is used for identifying the MME to which the UE is attached.

In the embodiment of the present invention, the access station may be an RN in a relay system or an HeNB in an evolved UMTS terrestrial radio access network (E-UTRAN) deployed with a home evolution Node B (HeNB). The donor station of the access node refers to a station that is connected to the access station in a wireless or wired manner and provides a specific service for the access station. The access station generally accesses a core network side through the donor station. For example, if the access station is an RN, the donor station may be an eNB; if the access station is an HeNB, the donor station may be an HeNB gateway (HeNB GW).

According to the method provided by the embodiment of the present invention, when the access node initiates the handover for the UE, the handover may be successfully performed through the MME pool information which is sent by the donor station of the access node and is used for identifying the MME to which the UE is attached.

Figure 2:
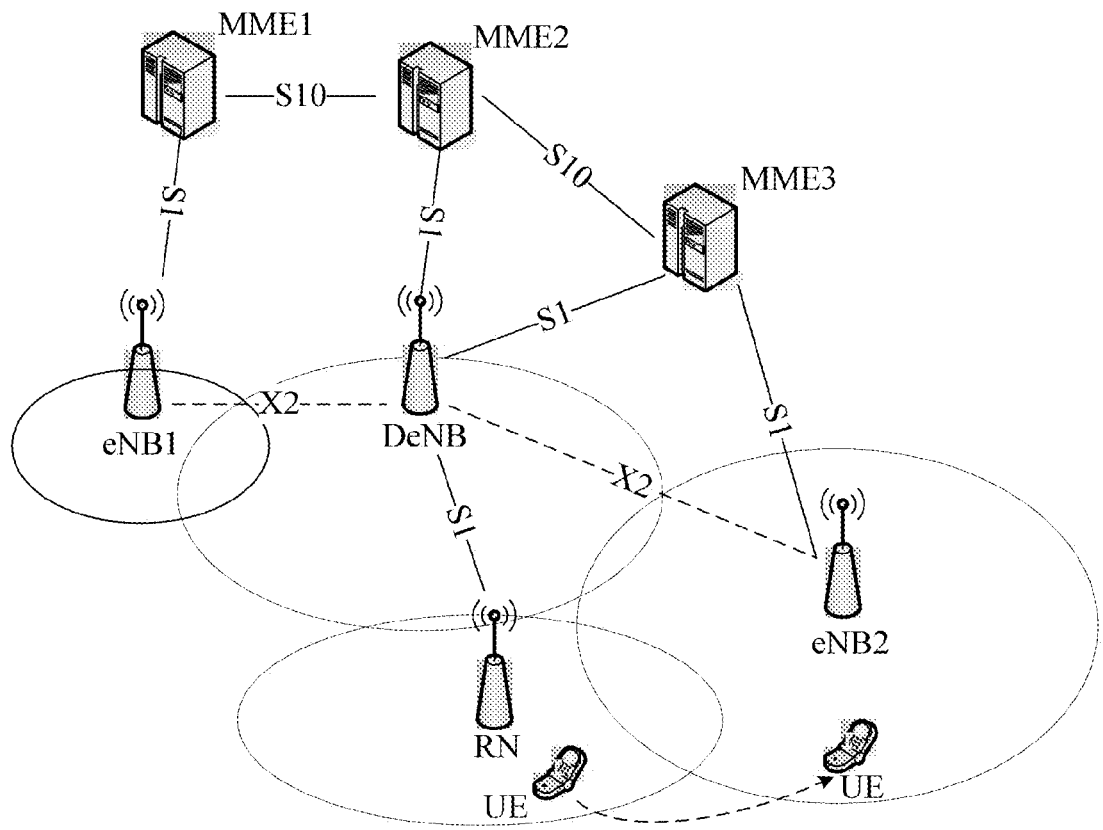
FIG. 2 is a schematic network structure diagram of a relay system in an embodiment of the present invention.

In a relay system shown in FIG. 2, a UE is in coverage of an RN. If the UE enters the coverage of the current RN through S1 handover, the RN may obtain the MME pool information, which is used for identifying the MME to which the UE is attached, through an S1 application protocol (S1 Application Protocol, S1AP) message in an S1 handover procedure. Alternatively, the UE may obtain the MME pool information, which is used for identifying the MME to which the UE is attached, through an S1AP message in an initial context setup (Initial context setup) procedure. For example, the RN may obtain the MME pool information, which is used for identifying the MME to which the UE is attached, through an S1AP message of an initial context setup procedure in an attach (attach) procedure or a track area update (Track Area Update, TAU) procedure of the UE.

The MME pool information used for identifying the MME may be a globally unique MME identifier (Globally Unique MME Identifier, GUMMEI) or a globally unique group ID (Globally Unique Group ID, GU Group ID). The RN may determine whether the MME pool of the MME to which the UE is attached and one or more MME pools to which a target access node of the handover for the UE belongs have the same MME pool, according to the obtained MME pool information of the MME to which the UE is currently attached. An MME pool refers to a logical area formed by one or more parallel (parallel) MMEs. In an MME pool, a UE may obtain a service without changing an MME to which the UE is attached. Different MME pools may overlap one another. When a UE is attached to an MME, an MME pool of the MME may be referred to as the MME pool of the MME to which the UE is attached. For an access node, for example, an eNB, or any other node for access, such as an RN, the number of MME pools to which the node belongs may be one or more.

In the embodiment of the present invention, after receiving the MME pool information which is sent by the donor station of the access node and is used for identifying the MME to which the UE is attached, the access node may save the MME pool information used for identifying the MME to which the UE is attached. When the access node is required to initiate handover for the UE later, the saved MME pool information used for identifying the MME to which the UE is attached may be used to determine whether the MME pool of the MME to which the UE is attached and one or more MME pools to which the target access node of the handover belongs have the same MME pool. Further, the MME pool information used for identifying the MME to which the UE is attached and MME pool information which is obtained by the access node and is of the target access node may be used to determine whether the MME pool of the MME to which the UE is attached and one or more MME pools to which the target access node of handover have the same MME pool, and determine a handover type. If the same MME pool exists, it may be determined that the MME to which the UE is attached does not change, and it may be determined that the handover type is X2 handover. If the same MME pool does not exist, it may be determined that the MME to which the UE is attached changes, and it may be determined that the handover type is S1 handover. Therefore, the access node may initiate corresponding handover according to the determined handover type.

An S1 interface exists between an RN and an eNB to which the RN is attached, but an S1 interface does not exist between the RN and an MME, so that the RN cannot interact with the MME directly to obtain the MME pool information used for identifying the MME to which the UE is attached. In the embodiment, the RN may obtain the MME pool information, which is used for identifying the MME to which the UE is attached, in an S1 handover procedure, or an attach procedure of the UE, or a TAU procedure.

For example, in a network system shown in FIG. 2, if the UE is handed over to the coverage of a current RN through an S1 handover procedure for example, the UE is handed over from eNB1 to the RN through S1 handover, during the S1 handover procedure, an eNB (DeNB) to which the target station RN is attached may send, through an S1AP message, the MME pool information used for identifying the MME to which the UE is attached to the RN.

Figure 3:
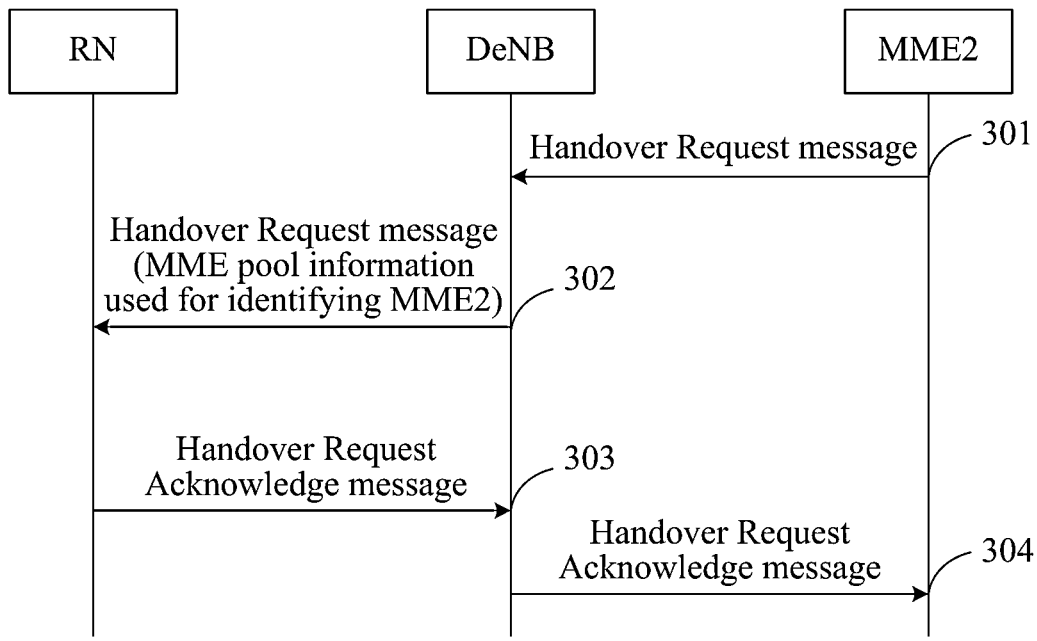
FIG. 3 is a schematic diagram of a method, for an RN to obtain handover type judgment information, provided by an embodiment of the present invention.

During the process of handing over the UE from eNB1 to the RN, as shown in FIG. 3, in step 301, a target MME (that is, MME2) of the S1 handover sends a handover request Handover Request message to the DeNB. In step 302, the DeNB sends the Handover Request message to the RN, and the Handover Request message includes the MME pool information used for identifying MME2 to which the UE is attached. Table 1 shows a message format of a Handover Request message provided by an embodiment of the present invention. The MME pool information used for identifying MME2 to which the UE is attached may be identified in the form of a GUMMEI or a GU Group ID. In Table 1, an MME UE S1AP ID is an S1AP ID used for identifying the UE on the DeNB, an eNB UE S1AP ID is an S1AP ID used for identifying the UE on the RN.

TABLE 1

| Information element/group name (IE/Group Name) | Presence (Presence) | Range (Range) | Information element type and reference (IE type and reference) | Semantics description (Semantics description) | Criticality (Criticality) | Assigned criticality (Assigned Criticality) |
|---|---|---|---|---|---|---|
| Message Type | M | | 9.2.1.1 | | YES | reject |
| MME UE S1AP ID | M | | 9.2.3.3 | | YES | reject |
| GUMMEI(or GU group ID) | O | | | The target MME ID (or the target MME pool ID) | YES | reject |
| Handover Type | M | | 9.2.1.13 | | YES | reject |
| Cause | M | | 9.2.1.3 | | YES | ignore |
| UE Aggregate Maximum Bit Rate | M | | 9.2.1.20 | | YES | reject |
| E-RABs To Be Setup List | M | | | | YES | reject |
| >E-RABs To Be Setup Item IEs | | 1 to <maxnoof E-RABs> | | | EACH | reject |
| >>E-RAB ID | M | | 9.2.1.2 | | — | |
| >>Transport Layer Address | M | | 9.2.2.1 | | — | |
| >>GTP-TEID | M | | 9.2.2.2 | To deliver UL PDUs | — | |
| >> E-RAB Level QoS Parameters | M | | 9.2.1.15 | Includes necessary QoS parameters | — | |
| >>Data Forwarding Not Possible | O | | 9.2.1.76 | | YES | ignore |
| Source to Target Transparent Container | M | | 9.2.1.56 | | YES | reject |
| UE Security Capabilities | M | | 9.2.1.40 | | YES | reject |
| Handover Restriction List | O | | 9.2.1.22 | | YES | ignore |
| Trace Activation | O | | 9.2.1.4 | | YES | ignore |
| Request Type | O | | 9.2.1.34 | | YES | ignore |
| SRVCC Operation Possible | O | | 9.2.1.58 | | YES | ignore |
| Security Context | M | | 9.2.1.26 | | YES | reject |
| NAS Security Parameters to E-UTRAN | C-iffromUTRAN GERAN | | 9.2.3.31 | The eNB shall use this IE as specified in [15]. | YES | reject |
| CSG Id | O | | 9.2.1.62 | | YES | reject |
| CSG Membership Status | O | | 9.2.1.73 | | YES | ignore |

In steps 303 and 304, after receiving the Handover Request message, the RN sends a handover request acknowledge Handover Request Acknowledge message to the DeNB, and the DeNB sends the Handover Request Acknowledge message to MME2.

Figure 4:
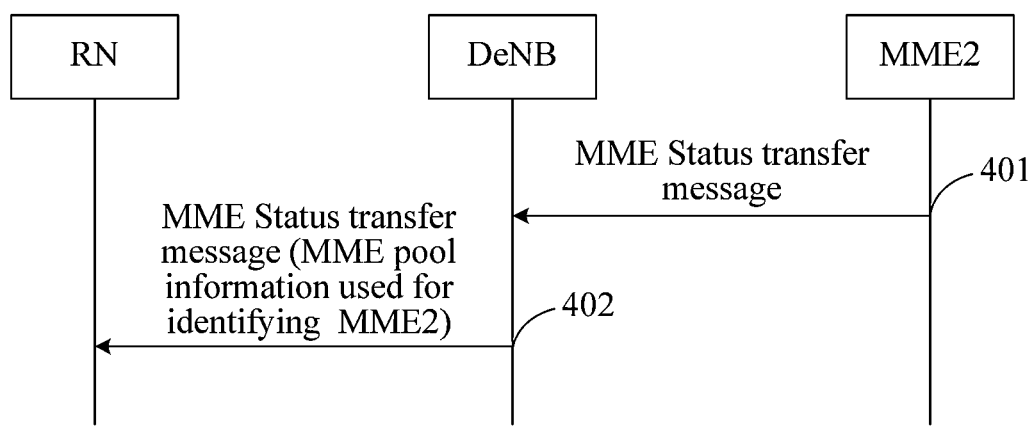
FIG. 4 is a schematic diagram of another method, for an RN to obtain handover type judgment information, provided by an embodiment of the present invention.

Alternatively, as shown in FIG. 4, the DeNB may send the MME pool information used for identifying the MME to which the UE is attached to the RN through an MME status transfer (MME Status transfer) message. In step 401, MME2 sends an MME Status transfer message to the DeNB.

In step 402, the DeNB sends the MME Status transfer message to the RN, and the MME Status transfer message includes the MME pool information used for identifying MME2 to which the UE is attached. Table 2 shows a message format of an MME Status transfer message provided by an embodiment of the present invention. The MME pool information used for identifying MME2 to which the UE is attached may be identified in the form of a GUMMEI or a GU Group ID. In Table 2, the MME UE S1AP ID is an S1AP ID used for identifying the UE on the DeNB, the eNB UE S1AP ID is an S1AP ID used for identifying the UE on the RN.

TABLE 2

| Information element/group name (IE/Group Name) | Presence (Presence) | Range (Range) | Information element type and reference (IE type and reference) | Semantics description (Semantics description) | Criticality (Criticality) | Assigned criticality (Assigned Criticality) |
|---|---|---|---|---|---|---|
| Message Type | M | | 9.2.1.1 | | YES | ignore |
| MME UE S1AP ID | M | | 9.2.3.3 | | YES | reject |
| eNB UE S1AP ID | M | | 9.2.3.4 | | YES | reject |
| eNB Status Transfer Transparent Container | M | | 9.2.1.31 | | YES | reject |

TABLE 2-continued

| Information element/group name (IE/Group Name) | Presence (Presence) | Range (Range) | Information element type and reference (IE type and reference) | Semantics description (Semantics description) | Criticality (Criticality) | Assigned criticality (Assigned Criticality) |
|---|---|---|---|---|---|---|
| GUMMEI(or GU group ID) | O | | | The target MME ID (or the target MME pool ID) | YES | reject |

Figure 5:
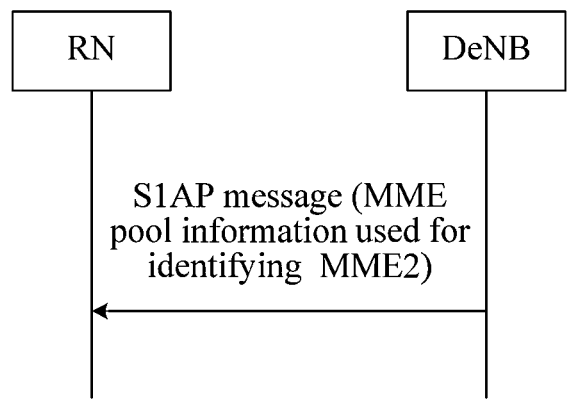
FIG. 5 is a schematic diagram of another method, for an RN to obtain handover type judgment information, provided by an embodiment of the present invention.

Alternatively, in the embodiment, the DeNB may send the MME pool information used for identifying MME2 to which the UE is attached to the RN through a new S1AP message, and as shown in FIG. 5, the DeNB sends an S1AP message to the RN. Table 3 shows a new S1AP message provided by an embodiment of the present invention, and the message is used for providing the RN with the MME pool information used for identifying MME2 to which the UE is attached. The MME pool information used for identifying MME2 to which the UE is attached may be identified in the form of a GUMMEI or a GU Group ID. In Table 3, the MME UE S1AP ID is an S1AP ID used for identifying the UE on the DeNB, the eNB UE S1AP ID is an S1AP ID used for identifying the UE on the RN.

which the UE is attached to the RN through an initial context setup request Initial context setup request message.

Figure 6:
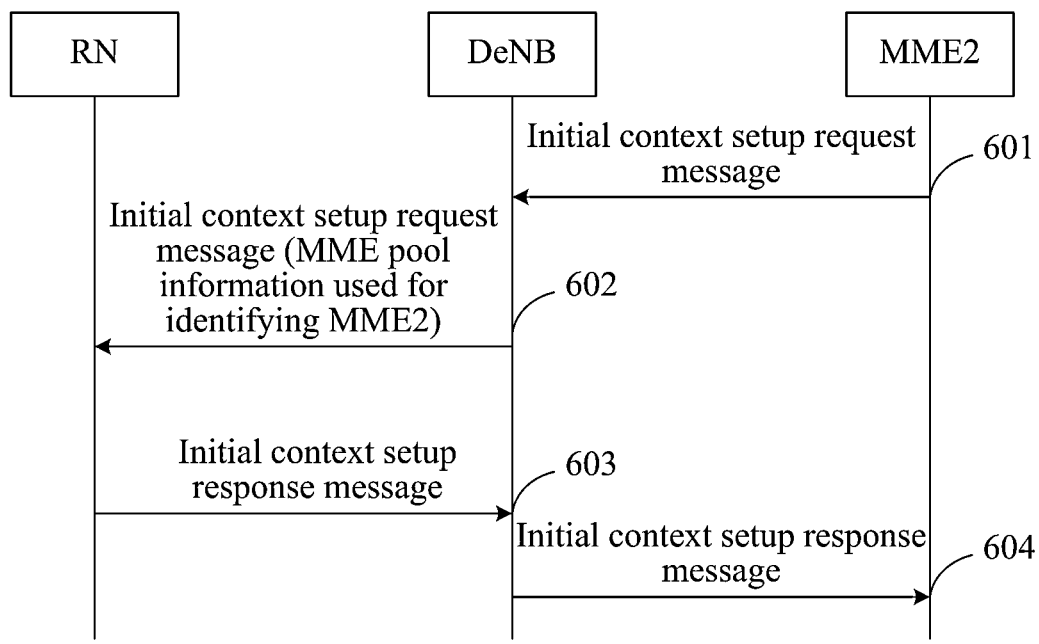
FIG. 6 is a schematic diagram of another method, for an RN to obtain handover type judgment information, provided by an embodiment of the present invention.

As shown in FIG. 6, in step 601, MME2 to which the UE is attached sends an Initial context setup request message to the DeNB.

In step 602, the DeNB sends the Initial context setup request message to the RN and the message includes the MME pool information used for identifying MME2 to which the UE is attached. Table 4 shows a message format of an Initial context setup request message provided by an embodiment of the present invention. The MME pool information used for identifying MME2 to which the UE is attached may

TABLE 3

| Information element/group name (IE/Group Name) | Presence (Presence) | Range (Range) | Information element type and reference (IE type and reference) | Semantics description (Semantics description) | Criticality (Criticality) | Assigned criticality (Assigned Criticality) |
|---|---|---|---|---|---|---|
| Message Type | M | | 9.2.1.1 | | YES | ignore |
| MME UE S1AP ID | M | | 9.2.3.3 | | YES | reject |
| eNB UE S1AP ID | M | | 9.2.3.4 | | YES | reject |
| GUMMEI(or GU group ID) | O | | | The target MME ID (or the target MME pool ID) | YES | reject |

In the embodiment of the present invention, when the UE performs an initial context setup procedure, for example, in a UE attach procedure or a TAU procedure, the DeNB may send the MME pool information used for identifying the MME to be identified in the form of a GUMMEI or a GU Group ID. In Table 4, the MME UE S1AP ID is an S1AP ID used for identifying the UE on the DeNB, the eNB UE S1AP ID is an S1AP ID used for identifying the UE on the RN.

TABLE 4

| Information element/group name (IE/Group Name) | Presence (Presence) | Range (Range) | Information element type and reference (IE type and reference) | Semantics description (Semantics description) | Criticality (Criticality) | Assigned criticality (Assigned Criticality) |
|---|---|---|---|---|---|---|
| Message Type | M | | 9.2.1.1 | | YES | reject |
| MME UE S1AP ID | M | | 9.2.3.3 | | YES | reject |
| eNB UE S1AP ID | M | | 9.2.3.4 | | YES | reject |
| GUMMEI(or GU group ID) | O | | | The target MME ID (or the target MME pool ID) | YES | reject |
| UE Aggregate Maximum Bit Rate | M | | 9.2.1.20 | | YES | reject |
| E-RAB to Be Setup List | M | | | | YES | reject |
| >E-RAB to Be Setup Item IEs | | 1 to <maxnoof E-RABs> | | | EACH | reject |
| >>E-RAB ID | M | | 9.2.1.2 | | — | |
| >>E-RAB Level QoS Parameters | M | | 9.2.1.15 | Includes necessary QoS parameters | — | |
| >>Transport Layer Address | M | | 9.2.2.1 | | — | |

TABLE 4-continued

| Information element/group name (IE/Group Name) | Presence (Presence) | Range (Range) | Information element type and reference (IE type and reference) | Semantics description (Semantics description) | Criticality (Criticality) | Assigned criticality (Assigned Criticality) |
|---|---|---|---|---|---|---|
| >>GTP-TEID | M | | 9.2.2.2 | | — | |
| >>NAS-PDU | O | | 9.2.3.5 | | — | |
| UE Security Capabilities | M | | 9.2.1.40 | | YES | reject |
| Security Key | M | | 9.2.1.41 | The KeNB is provided after the key-generation in the MME, see [15] | YES | reject |
| Trace Activation | O | | 9.2.1.4 | | YES | ignore |
| Handover Restriction List | O | | 9.2.1.22 | | YES | ignore |
| UE Radio Capability | O | | 9.2.1.27 | | YES | ignore |
| Subscriber Profile ID for RAT/Frequency priority | O | | 9.2.1.39 | | YES | ignore |
| CS Fallback Indicator | O | | 9.2.3.21 | | YES | reject |
| SRVCC Operation Possible | O | | 9.2.1.58 | | YES | ignore |
| CSG Membership Status | O | | 9.2.1.73 | | YES | ignore |

In steps 603 and 604, after receiving the Initial context setup request message, the RN obtains the MME pool information used for identifying MME2 to which the UE is attached, and sends an initial context setup response Initial context setup response message to the DeNB. The DeNB sends the Initial context setup response message to MME2 to which the UE is attached.

Figure 7:
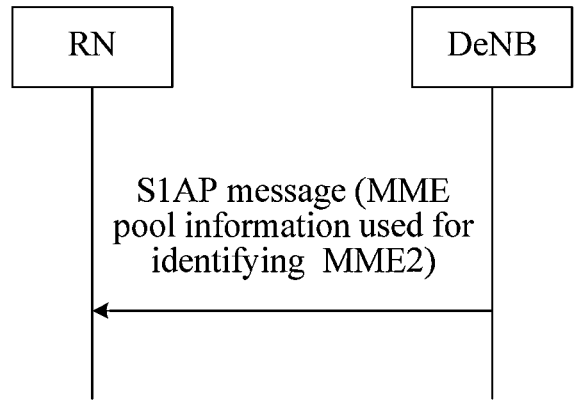
FIG. 7 is a schematic diagram of another method, for an RN to obtain handover type judgment information, provided by an embodiment of the present invention.

In an initial context setup procedure, the MME pool information used for identifying the MME to which the UE is attached may also be sent to the RN through a new S1AP message. As shown in FIG. 7, the DeNB sends an S1AP message to the RN, and the S1AP message may be a message shown in Table 3.

In the embodiment of the present invention, if a UE in coverage of the RN is required to be handed over to another target access node, for example, if the UE is handed over to another access node according to signal strength, bearing of a current cell, signal strength of a neighbor cell, and bearing of the neighbor cell that are measured and reported by the UE, to ensure that communication can be better performed, the UE may be handed over. The RN may obtain and save, according to the method described in the above embodiment for an RN to obtain handover type judgment information, judgment information used for identifying the handover type of the UE, determine, according to the handover type judgment information, whether the MME pool of the MME to which the UE is currently attached and one or more MME pools to which a target access node of the handover for the UE belongs have the same MME pool, determine whether the MME to which the UE is attached changes, and decide the handover type. For example, the RN may decide the handover type according to the MME pool information that is used for identifying the MME to which the UE is currently attached and is included in the Handover Request message, or the MME Status transfer message or a new S1AP message sent by the eNB in the S1 handover procedure; or decide the handover type according to the MME pool information that is used for identifying the MME to which the UE is currently attached and is included in the Initial context setup request message or a new S1AP message in the initial context setup procedure.

Figure 8:
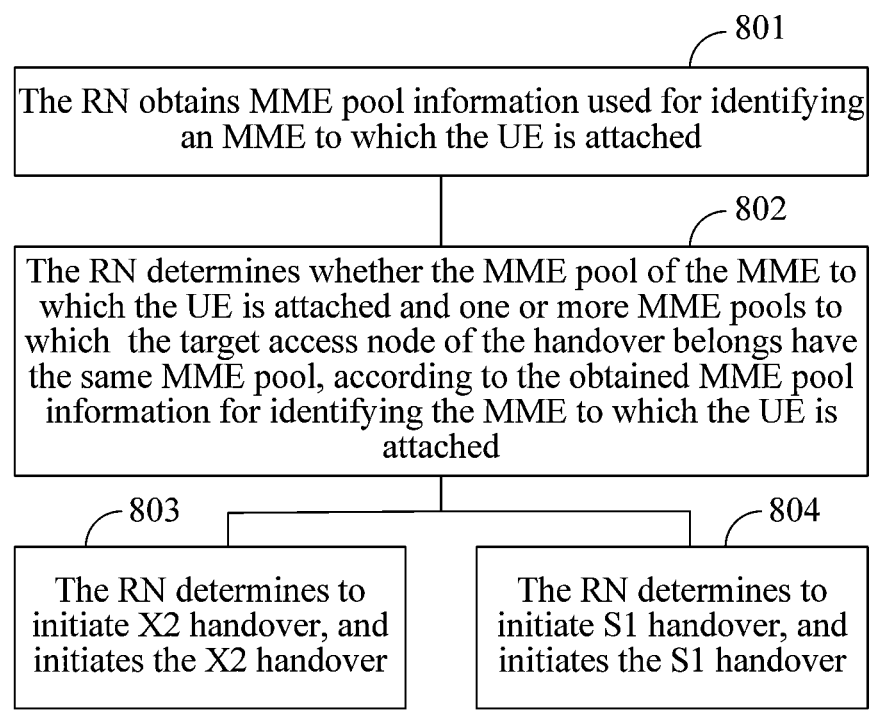
FIG. 8 is a schematic flow chart of a handover manner provided by an embodiment of the present invention.

FIG. 8 is a schematic diagram of a handover method provided in an embodiment of the present invention. In the embodiment, a UE in coverage of an RN is required to be handed over to another target access node.

In step 801, the RN obtains MME pool information used for identifying an MME to which the UE is attached.

In the embodiment, if the UE is handed over to the current RN through S1 handover, the RN may obtain the MME pool information, which is used for identifying the MME to which the UE is currently attached to, through the method shown in FIG. 3, FIG. 4 or FIG. 5 in the aforementioned embodiment. Alternatively, if the UE accesses the RN through an attach procedure or a TAU procedure, the RN may obtain the MME pool information to which the UE is currently attached in an initial context setup procedure through the method shown in FIG. 6 or FIG. 7 in the aforementioned embodiment. After the RN obtains the MME pool information, which is used for identifying the MME to which the UE is attached, through the aforementioned method, the information may be saved. When the RN is required to initiate handover for the UE, a type may be determined and judged according to the saved MME pool information used for identifying the MME to which the UE is attached.

In step 802, the RN determines whether the MME pool of the MME to which the UE is attached and one or more MME pools to which the target access node of the handover belongs have the same MME pool, according to the obtained MME pool information used for identifying the MME to which the UE is attached. If the same MME pool exists, step 803 is performed; if the same MME pool does not exist, step 804 is performed.

When the RN and a DeNB to which the RN is attached set up an X2 interface, the DeNB may inform the RN of MME pool information of an MME pool to which neighbor access nodes of the RN belongs. The neighbor access nodes include the target access node to which the UE is required to be handed over. If an X2 interface setup procedure is initiated by the RN, the DeNB may carry the MME pool information to which the neighbor access node belongs in an X2 setup response (X2 setup response) message, and send the message to the RN. If an X2 interface setup procedure is initiated by the DeNB, the DeNB may carry the MME pool information to which the neighbor access node belongs in an X2 setup request (X2 setup request) message, and send the message to the RN.

When a neighbor access node of the RN is updated, for example, when a new neighbor access node is found or MME pool information to which an existing neighbor access node belongs is updated, if an X2 interface between the neighbor access node of the RN and the DeNB to which the RN is attached is successfully set up or the neighbor access node of the RN initiates an eNB configuration update (eNB configuration update) procedure on the X2 interface to the DeNB, the DeNB triggers the eNB configuration update procedure on the X2 interface between the DeNB and the RN, and informs an identifier of the updated neighbor access node and the updated MME pool information corresponding to the neighbor access node to the RN.

Upon obtaining the MME pool information used for identifying the MME to which the UE is attached and MME pool information to which the target access node belongs, the RN may determine whether the MME pool of the MME to which the UE is attached and one or more MME pools to which the target access node belongs have the same MME pool.

In step 803, the RN determines to initiate X2 handover, and initiates the X2 handover.

If it is determined that the same MME pool exists, it is determined that the MME to which the UE is attached does not change, it is determined that a handover type is the X2 handover, and the X2 handover is initiated.

Further, in the embodiment of the present invention, an access node, such as the RN in the embodiment, is further required to consider whether the X2 interface between the access node and a target access node is available when it is determined that the handover type is the X2 handover. The X2 interface between the access node and the target access node is segmented, and includes an X2 interface between the access node and a donor station of the access node, an X2 interface between the donor station of the access node and a donor station to which the target access node is attached, and an X2 interface between the donor station to which the target access node is attached and the target access node, so that when the X2 interfaces are all available, the X2 interface between the access node and the target access node is available.

In step 804, the RN determines to initiate S1 handover, and initiates the S1 handover.

If it is determined that the same MME pool does not exist, it is determined that the MME to which the UE is attached changes, it is determined that a handover type is the S1 handover, and the S1 handover is initiated.

For example, if an RN, where the UE is currently located, includes multiple subordinate cells ECGI1, ECGI2 and ECGI3, and the MME pool of the MME to which the UE is attached is MME pool2. The target access node to which the UE is required to be handed over includes subordinate cells ECGI4, ECGI5 and ECGI6, and the MME pool to which the target access node belongs includes MME pool2 and MME pool3. When the UE is required to be handed over from current ECGI1 to ECGI5, the RN obtains, according to neighbor cell information, that the target cell ECGI5 belongs to the target access node. The RN may obtain the MME pool information used for identifying the MME to which the UE is currently attached, and accordingly determine that the MME pool of the MME to which the UE is currently attached is MME pool2 and has the same MME pool2 as MME pool2 and MME pool3 included in a MME pool list to which the target access node belongs, and then the RN determines to initiate X2 handover.

According to a solution provided by the embodiment of the present invention, the RN obtains the MME pool information used for identifying the MME to which the UE is attached, and may determine, according to the information, whether the MME pool of the MME to which the UE is attached and one or more MME pools to which the target access node of the handover belongs have the same MME pool, and may correctly determine a handover type required by the handover to initiates the handover.

Figure 9:
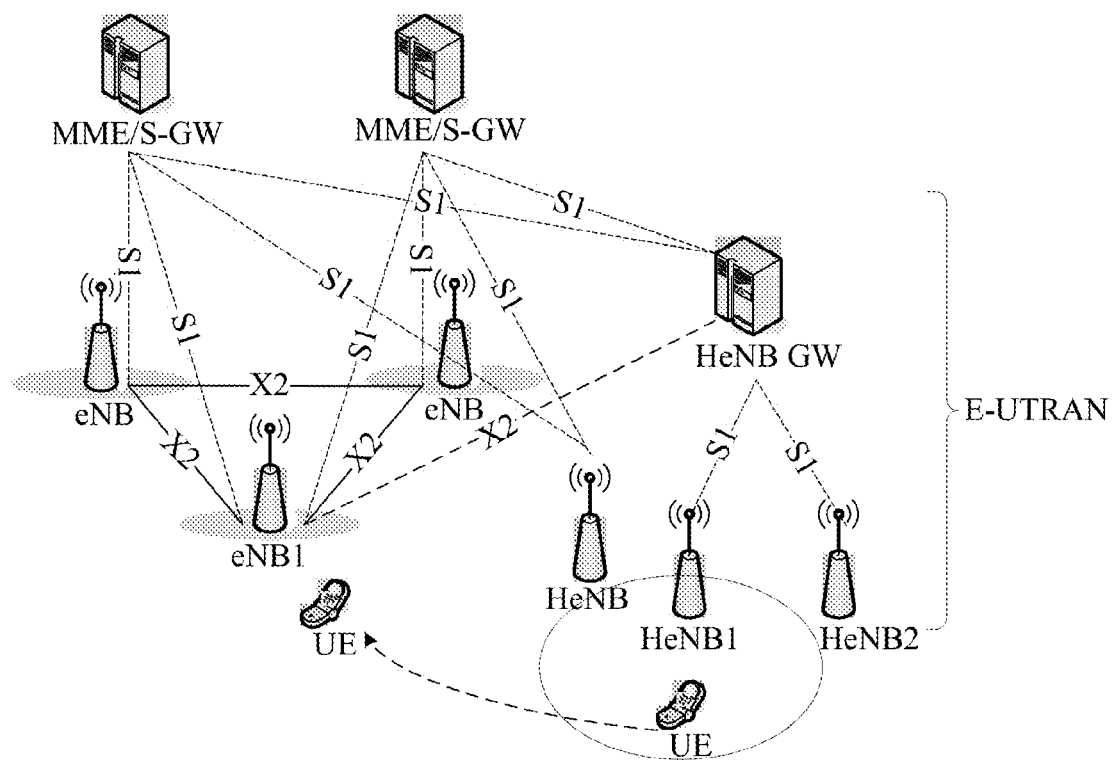
FIG. 9 is a schematic network structure diagram of an evolved UMTS terrestrial radio access network in an embodiment of the present invention.

FIG. 9 illustrates a network architecture of an evolved UMTS terrestrial radio access network (E-UTRAN) which is deployed with an HeNB and provided by the 3GPP protocol. In the network architecture, when a UE is handed over from HeNB1, where the UE is currently located, to another target access node, for example, to eNB1, HeNB1 is also required to decide a handover type. In the embodiment of the present invention, the method provided in the embodiment of the present invention is also applicable to that HeNB1 obtains handover type judgment information and determines, according to the handover type judgment information, that S1 handover or X2 handover is adopted.

If the UE enters coverage of current HeNB1 through S1 handover, HeNB1 may obtain MME pool information used for identifying an MME to which the UE is attached in an S1 handover procedure through an S1AP message sent by an HeNB gateway (HeNB GW) to HeNB1. The MME pool information used for identifying the MME to which the UE is attached may be a GUMMEI or a GU Group ID. For example, the HeNB GW sends a Handover Request message to HeNB1 in the S1 handover procedure. The Handover Request message carries the MME pool information used for identifying the MME to which the UE is attached. A message format of the Handover Request message may be as shown in Table 1. Alternatively, the HeNB GW may send an MME Status transfer message to the HeNB. The MME Status transfer message carries the MME pool information used for identifying the MME to which the UE is attached. A message format of the MME Status transfer message may be as shown in Table 2. Alternatively, the HeNB GW may send the MME pool information used for identifying the MME to which the UE is attached to an RN through a new S1AP message. A message format of the S1AP message may be as shown in Table 3.

Alternatively, during setup of an initial context setup procedure, for example, an attach procedure or a TAU procedure, the HeNB GW may send the MME pool information used for identifying the MME to which the UE is attached to HeNB1 through an Initial context setup request message. A message format of the Initial context setup request message may be as shown in Table 4. Alternatively, the HeNB GW may send the MME pool information used for identifying the MME to which the UE is attached to HeNB1 through a new S1AP message. A message format of the new S1AP message may be as shown in Table 3.

In the network architecture shown as shown in FIG. 9, when a UE in coverage of an HeNB is required to be handed over, a handover type may be judged correctly through the method provided by the embodiment of the present invention.

According to the method provided by the embodiment of the present invention, when a UE attached to an RN or an HeNB is handed over, a source node may obtain handover judgment type information, and determine a handover type of the handover, thereby solving a problem in the prior art that the source node cannot correctly decide a handover type.

Figure 10:
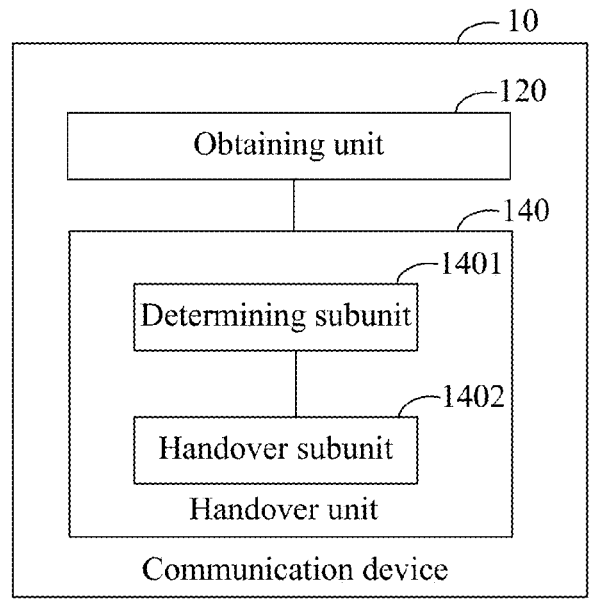
FIG. 10 is a schematic structural diagram of a communication device provided by an embodiment of the present invention.

FIG. 10 illustrates a communication device 10 provided by an embodiment of the present invention. The communication device 10 includes an obtaining unit 120 and a handover unit 140.

The obtaining unit 120 is configured to obtain MME pool information which is sent by a donor station of the communication device 10 and is used for identifying an MME to which a UE in coverage of the communication device 10 is attached. The handover unit 140 is configured to initiate handover for the UE according to the MME pool information that is obtained by the obtaining unit 120 and is used for identifying the MME to which the UE is attached, when the UE is required to be handed over.

After receiving the MME pool information used for identifying the MME to which the UE is attached, the obtaining unit 120 may save the MME pool information used for identifying the MME to which the UE is attached. When the handover unit 140 is required to initiate the handover for the UE, a handover type may be determined according to the MME pool information that is obtained and saved by the obtaining unit 120 and is used for identifying the MME to which the UE is attached, so as to perform the handover according to the determined handover type.

The communication device 10 may be an RN in a relay system or an HeNB in an E-UTRAN network deployed with an HeNB. If the communication device 10 is an RN, the donor station may be an eNB. If the communication device 10 is an HeNB, the donor station may be an HeNB GW.

The MME pool information used for identifying the MME to which the UE is attached may be a GUMMEI or a GU Group ID.

When the communication device 10 is a communication device being a target access node in an S1 handover procedure, and the donor station is a target donor station in the S1 handover procedure, the obtaining unit 120 may be configured to obtain the MME pool information, which is used for identifying the MME to which the UE is attached, according to a handover request message or an MME status transfer message or an S1 application protocol S1AP message sent by the target donor station. The S1AP message is used to transmit the MME pool information used for identifying the MME to which the UE is attached. The handover request message, the MME status transfer message and the S1AP message include the MME pool information used for identifying the MME to which the UE is attached. In the embodiment, for the method for the obtaining unit 120 in the communication device 10 to obtain the handover request message or the MME status transfer message or the S1AP message sent by the target station, reference can be made to the method provided in FIG. 3, FIG. 4 and FIG. 5 provided in the embodiment of the present invention. The handover request message may be the handover request message shown in Table 1, the MME status transfer message may be the MME Status transfer message shown in Table 2, and the S1AP message may be the message shown in Table 3.

Alternatively, in an initial context setup procedure, for example, a UE attach procedure or a TAU procedure, the obtaining unit 120 of the communication device 10 may be configured to obtain the MME pool information, which is used for identifying the MME to which the UE is attached, according to an initial context setup request message sent by the donor station in an initial context setup procedure or an S1AP message. The initial context setup request message and the S1AP message include the MME pool information used for identifying the MME to which the UE is attached. The S1AP message is used to transmit the MME pool information used for identifying the MME to which the UE is attached. In the embodiment, for the method for the obtaining unit 120 to obtain the initial context setup request message or the S1AP message sent by the donor station in the UE attach procedure or the track area update procedure, reference can be made to the method shown in FIG. 6 and FIG. 7 of the embodiment of the present invention. The initial context setup request message may be the message described in Table 4, and the S1AP message may be the message shown in Table 3.

The handover unit 140 may further include a determining subunit 1401 and a handover subunit 1402. The determining subunit 1401 is configured to determine, according to the MME pool information used for identifying the MME to which the UE is attached, a handover type. The determining subunit 1401 may determine, according to the MME pool information used for identifying the MME to which the UE is attached, whether the MME pool of the MME to which the UE is attached and one or more MME pools to which the target access node of the handover belongs have the same MME pool. If the same MME pool exists, the access node determines that the handover type is X2 handover. If the same MME pool does not exist, the access node determines that the handover type is S1 handover. The determining subunit 1401 may determine that the MME to which the UE is attached does not change when the same MME pool exists, and determine that the handover type is the X2 handover, so that the handover subunit 1402 initiates the X2 handover. The determining subunit 1401 may determine that the MME to which the UE is attached changes when the same MME pool does not exist, and determine that the handover type is the S1 handover, so that the handover subunit 1402 initiates the S1 handover.

Further, in the embodiment, the obtaining unit 120 may further obtain MME pool information of the target access node sent by the donor station through an X2 interface setup procedure or an eNB configuration update procedure between the communication device 10 and the donor station, so that the determining subunit 1401 may determine, according to the MME pool information used for identifying the MME to which the UE is attached and the MME pool information of the target access node, whether the MME pool of the MME to which the UE is attached and one or more MME pools to which the target access node belongs have the same MME pool.

According to the communication device provided by the embodiment of the present invention, the handover type of the handover that is to be initiated for the UE may be determined according to the MME pool information which is provided by the donor station of the communication device and is used for identifying the MME to which the UE is attached, so as to perform the handover successfully.

Figure 11:
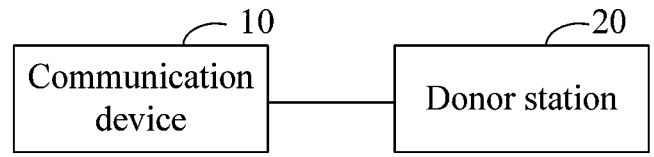
FIG. 11 is a schematic structural diagram of a communication system provided by an embodiment of the present invention.

FIG. 11 is a schematic diagram of a communication system provided by an embodiment of the present invention. The communication system includes the communication device 10 shown in FIG. 10 and a donor station 20 of the communication device 10. The communication device 10 is configured to receive mobility management entity pool MME pool information which is sent by the donor station 20 and is used for identifying an MME to which a UE is attached, and initiate handover for the UE according to the MME pool information used for identifying the MME to which the UE is attached. For the method for the communication device 10 in the communication system provided by the embodiment to receive the MME pool information which is sent by the donor node 20 and is used for identifying the MME to which the UE is attached, reference can be made to the method shown in FIG. 3 to FIG. 7 provided by the embodiment of the present invention, and for the method for the communication device 10 to initiate the handover, reference can be made to the method shown in FIG. 8 of the embodiment of the present invention. Details are not repeated herein.

Figure 12:
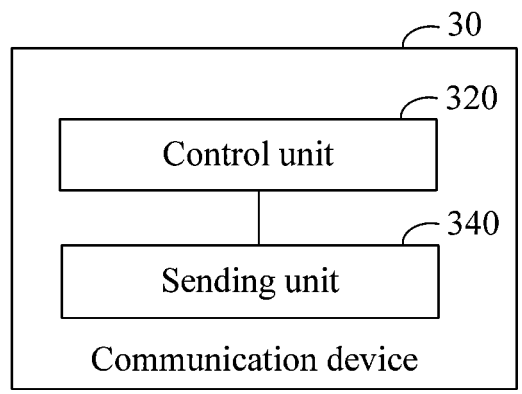
FIG. 12 is a schematic structural diagram of another communication device provided by an embodiment of the present invention.

As shown in FIG. 12, the present invention provides another communication device 30, and the communication device 30 may include: a control unit 320, configured to control a sending unit 340 to send information; the sending unit 340, associated with the control unit 320 and configured to send, according to the control of the control unit 320, mobility management entity pool MME pool information used for identifying a mobility management entity MME to which a user equipment UE in coverage of an access node is attached to the access node, where the communication device 30 is a donor station of the access node.

In the embodiment, the communication device 30 may be an eNB, an access point may be an RN. Alternatively, the communication device 30 may be an HeNB GW, and the access point may be an HeNB.

In the embodiment, the sending unit 340 sends the MME pool information used for identifying the MME to which the UE is attached to the access node, so that the access node initiates the handover for the UE according to the MME pool information used for identifying the MME to which the UE is attached. For the method of initiating the handover for the UE, reference can be made to the method provided by the method embodiment shown in FIG. 8.

In the embodiment, the sending unit 340 may send the MME pool information used for identifying the MME to which the UE is attached to the access node through a handover request message or an MME status transfer message or an S1 application protocol S1AP message, for example, through the method embodiment shown in FIG. 3, FIG. 4 or FIG. 5. Alternatively, the sending unit 340 may send the information used for identifying the MME pool of the MME to which the UE is attached to the access node through an initial context setup request message in an initial context setup procedure or an S1AP message, for example, through the method provided by the method embodiment shown in FIG. 6 or FIG. 7.

In the embodiment, the MME pool information used for identifying the MME to which the UE is attached may be a GUMMEI or a GU Group ID.

According to the communication device 30 provided by the embodiment of the present invention, the MME pool information used for identifying the MME to which the UE is attached may be sent to the access point, so that the access point may determine a handover type of the handover required to be initiated for the UE, so as to perform the handover successfully.

Figure 13:
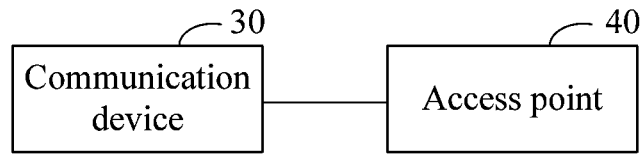
FIG. 13 is a schematic structural diagram of another communication system provided by an embodiment of the present invention.

As shown in FIG. 13, an embodiment of the present invention further provides another communication system. The communication system may include the communication device 30 as shown in FIG. 12, and may further include an access point 40 attached to the communication device 30. The communication device 30 may send mobility management entity pool MME pool information used for identifying an MME to which a UE is attached to the access point 40, so that the access point 40 may initiate handover for the UE according to the MME pool information used for identifying the MME to which the UE is attached. For the method for the communication device 30 in the communication system provided by the embodiment to send the MME pool information used for identifying the MME to which the UE is attached to the access point 40, reference can be made to the method shown in any one of FIG. 3 to FIG. 7 provided by the embodiment of the present invention, and for the method for the access point 40 to initiate the handover, reference can be made to the method shown in FIG. 8 of the embodiment of the present invention, and details are not repeated herein.

Through the above description of the implementation, persons skilled in the art can understand that the present invention may be implemented through software plus a necessary universal hardware platform or through hardware. But in many cases, the software implementation is preferred. Based on the understanding, the technical solutions or the part that makes contributions to the prior art can be substantially embodied in the form of a software product. The computer software product is stored in a storage medium and contains several instructions to instruct computer equipment (for example, a personal computer, a server, or network equipment) to perform the method described in the embodiments of the present invention.

Although the present invention is illustrated and described with reference to some exemplary embodiments of the present invention, it should be understood by persons of ordinary skill in the art that various modifications may be made to the present invention with respect to forms and details without departing from the scope of the present invention.

What is claimed is:

1. A handover method, used for handing over a user equipment (UE) from a source access node to a target access node in a long term evolution (LTE) system,
   wherein the source access node accesses a mobility management entity (MME) through a donor station of the source access node;
   wherein handover types of the LTE system comprise an X2 handover and an S1 handover;
   wherein in the X2 handover, an X2 interface between two base stations acts as a reference point;
   wherein in the S1 handover, an S1 interface between an MME and a base station acts as a reference point; and
   wherein the method comprises:
      obtaining, by the source access node, a globally unique MME identifier (GUMMEI) sent by the donor station, wherein the GUMMEI is used for identifying a MME to which the UE in coverage of the source access node is attached, and the GUMMEI is sent by the donor station to the source access node through an initial context setup request message or an S1 handover request message;
      obtaining, by the source access node, MME pool information of the target access node sent by the donor station;
      determining, by the source access node, a handover type of the handover according to the obtained GUMMEI and the MME pool information of the target access node,
         wherein the handover type is X2 handover if an MME pool of the MME to which the UE in coverage of the source access node is attached and an MME pool to which the target access node belongs are the same, and
         wherein the handover type is S1 handover if the MME pool of the MME to which the UE in coverage of the source access node is attached and the MME pool to which the target access node belongs are different; and
      initiating, by the source access node, the handover according to the determined handover type.

2. The method according to claim 1, wherein the access node is a relay node and the donor station is an evolved node B (eNB).

3. The method according to claim 1, wherein the access node is a home evolution node B (HeNB) and the donor station is a home evolution node B gateway (HeNB GW).

4. The method according to claim 1, wherein the MME pool information of the target access node is sent by the donor station to the source access node through a setup procedure of an X2 interface between the source access node and the donor station or an eNB configuration update procedure.

5. A computer program product, comprising a non-transitory computer readable storage medium, wherein the computer readable storage medium comprises a program, and the program enables a computer to execute the handover method according to claim 1 when the program is run in the computer.

6. The method according to claim 1, wherein the MME pool information of the target access node is a Globally Unique (GU) Group ID.

7. A communication device, used as a source access node for handing over a user equipment (UE) from the source access node to a target access node in a long term evolution (LTE) system,
   wherein the source access node accesses a mobility management entity (MME) through a donor station of the source access node;
   wherein handover types of the LTE system comprise an X2 handover and an S1 handover;
   wherein in the X2 handover, an X2 interface between two base stations acts as a reference point;
   wherein in the S1 handover, an S1 interface between an MME and a base station acts as a reference point; and
   wherein the communication device comprises:
   a processor and a non-transitory computer readable storage medium, wherein the non-transitory computer readable storage medium comprises a program stored therein, and when the program runs, the following steps are performed:
      obtaining a globally unique MME identifier (GUMMEI) sent by the donor station, wherein the GUMMEI is used for identifying a MME to which the UE in coverage of the communication device is attached, and the GUMMEI is sent by the donor station to the communication device through an initial context setup request message or an S1 handover request message;
      obtaining MME pool information of the target access node sent by the donor station;
      determining a handover type of the handover according to the obtained GUMMEI and the MME pool information of the target access node,
         wherein the handover type is X2 handover if an MME pool of the MME to which the UE in coverage of the source access node is attached and an MME pool to which the target access node belongs are the same, and
         wherein the handover type is S1 handover if the MME pool of the MME to which the UE in coverage of the source access node is attached and the MME pool to which the target access node belongs are different; and
      initiating the handover according to the determined handover type.

8. The communication device according to claim 7, wherein the communication device is a relay node and the donor station is an evolved node B (eNB).

9. The communication device according to claim 7, wherein the communication device is a home evolution node B (HeNB) and the donor station is a home evolution node B gateway (HeNB GW).

10. The communication device according to claim 7, wherein the MME pool information of the target access node is sent by the donor station to the communication device through a setup procedure of an X2 interface between the communication device and the donor station or an eNB configuration update procedure.

11. The communication device according to claim 7, wherein the MME pool information of the target access node is a Globally Unique (GU) Group ID.

12. A communication device, as a donor station of a source access node, which is used for handing over a user equipment (UE) from the source access node to a target access node in a long term evolution (LTE) system,
   wherein the source access node accesses a mobility management entity (MME) through the donor station;
   wherein handover types of the LTE system comprise an X2 handover and an S1 handover;
   wherein in the X2 handover, an X2 interface between two base stations acts as a reference point;
   wherein in the S1 handover, an S1 interface between an MME and a base station acts as a reference point; and
   wherein the communication device comprises:
   a sender, a processor and a non-transitory computer readable storage medium, wherein the non-transitory computer readable storage medium comprises a program stored therein, and when the program runs, the following steps are performed:
      controlling the sender to send a globally unique MME identifier (GUMMEI) to the source access node, wherein the GUMMEI is used for identifying a MME to which the UE in coverage of the source access node is attached, and the GUMMEI is sent by the sender to the source access node through an initial context setup request message or an S1 handover request message; and,
      controlling the sender to send MME pool information of the target access node to the source access node, wherein the GUMMEI and the MME pool information of the target access node are used for determining by the source access node a handover type of the handover,
         wherein the handover type is X2 handover if an MME pool of the MME to which the UE in coverage of the source access node is attached and an MME pool to which the target access node belongs are the same, and
         wherein the handover type is S1 handover if the MME pool of the MME to which the UE in coverage of the source access node is attached and the MME pool to which the target access node belongs are different.

13. The communication device according to claim 12, wherein the access node is a relay node and the communication device is an evolved node B (eNB).

14. The communication device according to claim 12, wherein the access node is a home evolution node B (HeNB) and the communication device is a home evolution node B gateway (HeNB GW).

15. The communication device according to claim 12, wherein the MME pool information of the target access node is a Globally Unique (GU) Group ID.

16. A handover method, comprising:
   obtaining, by a first access node, donor station information sent by a donor station of the first access node, wherein the donor station information relates to a handover in a long term evolution (LTE) system and comprises:

a globally unique mobility management entity (MME) identifier (GUMMED, wherein the GUMMEI is used for identifying a MME to which a user equipment (UE) in coverage of the first access node is attached, and the GUMMEI is comprised in an initial context setup request message or in a S1 handover request message; and MME pool information of a target access node of the handover, wherein the target access node is distinct from the first access node;

determining, by the first access node, a handover type of the handover according to the donor station information, wherein the handover type is X2 handover if an MME pool of the MME to which the UE in coverage of the first access node is attached and an MME pool to which the target access node belongs are the same, and wherein the handover type is S1 handover if the MME pool of the MME to which the UE in coverage of the first access node is attached and the MME pool to which the target access node belongs are different; and initiating, by the first access node, the handover according to the determined handover type.

17. The method according to claim 16, wherein the first access node is a relay node and the donor station is an evolved node B (eNB).

18. The method according to claim 16, wherein the first access node is a home evolution node B (HeNB) and the donor station is a home evolution node B gateway (HeNB GW).

19. The method according to claim 16, wherein the MME pool information of the target access node is notified by the donor station to the first access node through a setup procedure of an X2 interface between the first access node and the donor station or an eNB configuration update procedure.

20. The method according to claim 16, wherein the MME pool information of the target access node is a Globally Unique (GU) Group ID.

* * * * *

UNITED STATES PATENT AND TRADEMARK OFFICE
CERTIFICATE OF CORRECTION

| | | |
|---|---|---|
| PATENT NO. | : 8,913,588 B2 | Page 1 of 1 |
| APPLICATION NO. | : 13/633020 | |
| DATED | : December 16, 2014 | |
| INVENTOR(S) | : Jing Liu | |

It is certified that error appears in the above-identified patent and that said Letters Patent is hereby corrected as shown below:

On the Title Page, Item (72) Inventors, line 2, delete "Wang Ke" and insert --Ke Wang--.

Signed and Sealed this
Ninth Day of June, 2015

Michelle K. Lee
*Director of the United States Patent and Trademark Office*